_(12)_ United States Patent
Horii

(10) Patent No.: US 9,328,757 B2
(45) Date of Patent: May 3, 2016

(54) HYDRAULIC SYSTEM FOR WORK MACHINE

(75) Inventor: Hiroshi Horii, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 345 days.

(21) Appl. No.: 13/983,276

(22) PCT Filed: Aug. 21, 2012

(86) PCT No.: PCT/JP2012/071049
§ 371 (c)(1),
(2), (4) Date: Aug. 1, 2013

(87) PCT Pub. No.: WO2013/035521
PCT Pub. Date: Mar. 14, 2013

(65) Prior Publication Data
US 2013/0312402 A1      Nov. 28, 2013

(30) Foreign Application Priority Data

Sep. 8, 2011     (JP) .................. 2011-196026

(51) Int. Cl.
*F15B 21/04*      (2006.01)
*F16B 15/00*      (2006.01)
*E02F 9/22*       (2006.01)

(52) U.S. Cl.
CPC .............. *F16B 15/00* (2013.01); *E02F 9/2203* (2013.01); *E02F 9/226* (2013.01); *E02F 9/2239* (2013.01); *E02F 9/2285* (2013.01); *E02F 9/2292* (2013.01); *E02F 9/2296* (2013.01); *F15B 21/042* (2013.01); *F15B 2211/355* (2013.01); *F15B 2211/62* (2013.01); *F15B 2211/6355* (2013.01); *F15B 2211/8755* (2013.01)

(58) Field of Classification Search
CPC .... F15B 21/042; F15B 21/04; F15B 2211/62; F15B 2211/355; F15B 2211/6355
USPC .................................................. 60/329, 399
See application file for complete search history.

(56) References Cited

U.S. PATENT DOCUMENTS

| 4,972,762 | A | * | 11/1990 | Kubik .............................. 91/461 |
| 5,667,051 | A | * | 9/1997 | Goldberg et al. .......... 192/85.01 |
| 6,241,482 | B1 | * | 6/2001 | Iga .............................. 417/222.1 |
| 7,287,374 | B2 | * | 10/2007 | Vigholm et al. ................ 60/329 |

FOREIGN PATENT DOCUMENTS

| DE | 41 35 016 A1 | 4/1993 |
| JP | 4-219505 A | 8/1992 |
| JP | 5-125747 A | 5/1993 |
| JP | 7-26590 A | 1/1995 |
| JP | 2002-89506 A | 3/2002 |
| JP | 2003-184827 A | 7/2003 |
| JP | 2009-79366 A | 4/2009 |
| JP | 2010-71425 A | 4/2010 |

* cited by examiner

*Primary Examiner* — Nathaniel Wiehe
*Assistant Examiner* — Abiy Teka
(74) *Attorney, Agent, or Firm* — Birch, Stewart, Kolasch & Birch, LLP

(57) ABSTRACT

Provided is a hydraulic system for a work machine, which can ensure low temperature responsiveness of remote control valves that perform pilot operations of pilot operated directional control valves for controlling hydraulic actuators, respectively. In order to, with bringing an unloading valve V13 to an unloading position 29, circulate oil to a pilot pump oil passage w that supplies the pressure oil from the discharging circuit Y for a pilot pump 19 to remote control valves PV1, PV2, and PV6, a warm-up circuit H that flows the oil from the discharging circuit Y for the pilot pump 19 to a terminal of the pilot pump oil passage w is provided.

3 Claims, 7 Drawing Sheets

Fig.4A

< Operation pattern >

|  | 1 | 2 | 3 | 4 | 5 |
|---|---|---|---|---|---|
| Boom operation detector | on/off | ON | OFF | ON | OFF |
| Traveling operation detector | on/off | OFF | ON | ON | OFF |
| Torque position | P | E 1 | | | E 2 |

Fig.4B

< Output pattern >

| Torque position | Maximum torque rate |
|---|---|
| P | 100% |
| E 1 | 80% |
| E 2 | 60% |

HYDRAULIC SYSTEM FOR WORK MACHINE

TECHNICAL FIELD

The present invention relates to a hydraulic system for a work machine such as a backhoe.

BACKGROUND ART

Currently, as a work machine, there is a backhoe described in Patent Literature 1.

The backhoe is revolvably mounted with a revolving base on a traveling body, provided with a front operating unit on a front side of the revolving base, and also provided with a dozer unit on front sides of travelling units.

The traveling body is provided with a left and right pair of traveling units that are respectively driven by traveling motors, and the dozer unit is provided with a blade that is moved up and down by a dozer cylinder. The revolving base is revolvably driven by a revolving motor.

On the front side of the revolving base, a swing bracket provided swingably left and right is provided, and the swing bracket is driven swingably left and right by a swing cylinder.

The front operating unit has: a boom that is pivotally connected to the swing bracket; an arm that is pivotally connected to the boom; and a bucket that is pivotally connected to the arm, and the boom, arm, and bucket are swingably driven by a boom cylinder, arm cylinder, and bucket cylinder, respectively.

The traveling motors and revolving motor are configured to include hydraulic motors, respectively, and the dozer cylinder, swing cylinder, boom cylinder, arm cylinder, and bucket cylinder are configured to include hydraulic cylinders, respectively.

Control valves that control the traveling motors, revolving motor, dozer cylinder, swing cylinder, boom cylinder, arm cylinder, and bucket cylinder are respectively configured to include pilot operated directional control valves that are respectively subjected to pilot operations, and the respective control valves are subjected to pilot operations by remote control valves.

Also, in the backhoe, oil discharged from a pilot pump is supplied to a pilot pump oil passage through an unloading valve, and from the pilot pump oil passage, the discharged oil from the pilot pump is supplied to the respective remote control valves. The pilot oil passage is configured to include a hydraulic hose.

The unloading valve is adapted to be switchable between a supply position where a discharging circuit for the pilot pump is communicatively connected to a starting end of the pilot pump oil passage and an unloading position where the communicative connection between the discharging circuit and the starting end of the pilot pump oil passage is blocked and also the starting end of the pilot pump oil passage is communicatively connected to a tank.

Further, the backhoe is adapted such that by switching the unloading valve to the unloading position at the time of getting out of the backhoe, a hydraulic actuator as an operational object is not activated even in the case of operating a corresponding one of the remote control valves.

CITATION LIST

Patent Literature

Patent Literature 1
  Japanese Unexamined Patent Publication JP-A2009-79366

SUMMARY OF INVENTION

Technical Problem

At the time of low temperature, viscosity of the oil increases to increase a pressure loss due to flow resistance, and therefore responsiveness of any of the remote control valves slows down (operability becomes worse).

Therefore, in order to ensure the responsiveness of the remote control valve, currently, a hose diameter of the hydraulic hose from the unloading valve to the remote control valve is increased in size, or a sufficient warm-up operation is recommended.

However, only by increasing the hose diameter of the hydraulic hose in size, the low temperature responsiveness of the remote control valve cannot be sufficiently increased in some cases.

Also, even in the case of sufficiently performing the warm-up operation, in a state where the unloading valve is switched to the unloading position, the discharged oil from the pilot pump does not flow to the pilot pump oil passage to prevent the oil in the pilot pump oil passage from being warmed, and therefore it is difficult to sufficiently improve the responsiveness of the remote control valve. Also, even in the case where the unloading valve is switched to the supply position to perform the warm-up operation, because the pilot pump oil passage is a closed circuit, the oil does not flow except for leakage from the remote control valve, and therefore it is difficult to promptly raise temperature of the oil in the pilot pump oil passage.

Alternatively, there is a method that, by warming oil in an oil passage on a secondary side of the remote control valve, improves the low temperature responsiveness of the remote control valve.

In this method, in a circuit from a secondary side port of the remote control valve to a pilot pressure receiving part of a corresponding control valve that controls a corresponding hydraulic actuator, a switching valve switchable between a warm-up position and a pilot pressure supply position is set, and at the time of performing the warm-up operation, the switching valve is switched to the warm-up position, so that in the case where the switching valve is switched to the warm-up position, the discharged oil from the pilot pump is sent to the secondary side port of the remote control valve through the switching valve. The oil sent to the secondary side port returns to the tank from a tank port of the remote control valve, and therefore the oil passage on the secondary side of the remote control valve can be warmed.

Also, at the time of operating the remote control valve to control the control valve, the switching valve is switched to the pilot pressure supply position, and in the case where the switching valve is switched to the pilot pressure supply position, the discharged oil from the pilot pump is blocked from being supplied to the secondary side port of the remote control valve, and also pressure on the secondary side of the remote control valve can be supplied to the pilot pressure receiving part of the control valve.

In this method, in the circuit from the secondary side port of the remote control valve to the pilot pressure receiving part of the control valve, the switching valve is set, and therefore at the time of operating the remote control valve to send the pilot pressure to the control valve, the switching valve serves as resistance to cause a pressure loss, and therefore a response delay occurs.

Therefore, the present invention is intended to, in consideration of the above-described problems, provide a hydraulic system for a work machine, which can successfully ensure low temperature responsiveness of remote control valves that perform pilot operations of pilot operated directional control valves for controlling hydraulic actuators, respectively.

Solution to Problem

Technical means that are, in order to solve the above technical problems, taken by the present invention are characterized by the points described below.

A first aspect of the present invention is a hydraulic system for a work machine, which is configured to be provided with remote control valves that perform pilot operations of pilot operated directional control valves for controlling hydraulic actuators, respectively, and supply pressure oil from a discharging circuit for a pilot pump to the remote control valves through a pilot pump oil passage, and provided with an unloading valve that is switchable between a supply position where the discharging circuit is communicatively connected to a starting end of the pilot pump oil passage and an unloading position where the communicative connection between the discharging circuit and the starting end of the pilot pump oil passage is blocked, and the starting end of the pilot pump oil passage is communicatively connected to a tank, and the hydraulic system for a work machine is provided with a warm-up circuit that flows the oil from the discharging circuit to a terminal of the pilot pump oil passage.

In a second aspect of the present invention, the warm-up circuit is adapted to be provided with: a connecting oil passage that connects the discharging circuit and the terminal of the pilot pump oil passage to each other; and flow rate limiting means that is provided in the connecting oil passage and adapted to flow the oil from the discharging circuit to the pilot pump oil passage with limiting a flow rate.

In a third aspect of the present invention, the flow rate limiting means is configured to include a restriction.

Advantageous Effects of Invention

According to the present invention, the following effects are produced.

According to the first aspect of the present invention, in the case of performing a warm-up operation of the work machine with bringing the unloading valve to the unloading position, the oil discharged from the pilot pump flows from the discharging circuit to the terminal of the pilot pump oil passage through the warm-up circuit, as well as circulating to the starting end side through the pilot pump oil passage to be discharged from the starting end to the tank through the unloading valve. Accordingly, the oil sucked up from the tank by the pilot pump circulates to the tank through the pilot pump oil passage. This enables the oil in the pilot pump oil passage to be promptly warmed, and therefore low temperature responsiveness of the remote control valves can be ensured.

Also, in the case of operating the remote control valves to output secondary side pressures, the unloading valve is switched to the supply position, and the discharged oil from the pilot pump is supplied to the pilot pump oil passage from the starting end side; however, the warm-up circuit is configured to connect the discharging circuit for the pilot pump to the terminal of the pilot pump oil passage, and therefore the warn-up circuit does not cause a delay in response at the time of operating any of the remote control valves.

According to the second aspect of the present invention, the flow rate limiting means provided in the warm-up circuit can limit the flow rate of the oil flowing from the discharging circuit to the pilot pump oil passage through the connecting oil passage. This enables a hydraulic actuator as an operational object to be prevented from being activated even in the case of operating a corresponding remote control valve when the unloading valve is switched to the unloading position.

According to the third aspect of the present invention, the flow rate limiting means is configured to include the restriction, and can be thereby provided at low cost.

BRIEF DESCRIPTION OF DRAWINGS

FIG. 4A is a table listing torque position switching operation patterns.
FIG. 4B is a table listing main pump output patterns.

DESCRIPTION OF EMBODIMENTS

Figure 1:
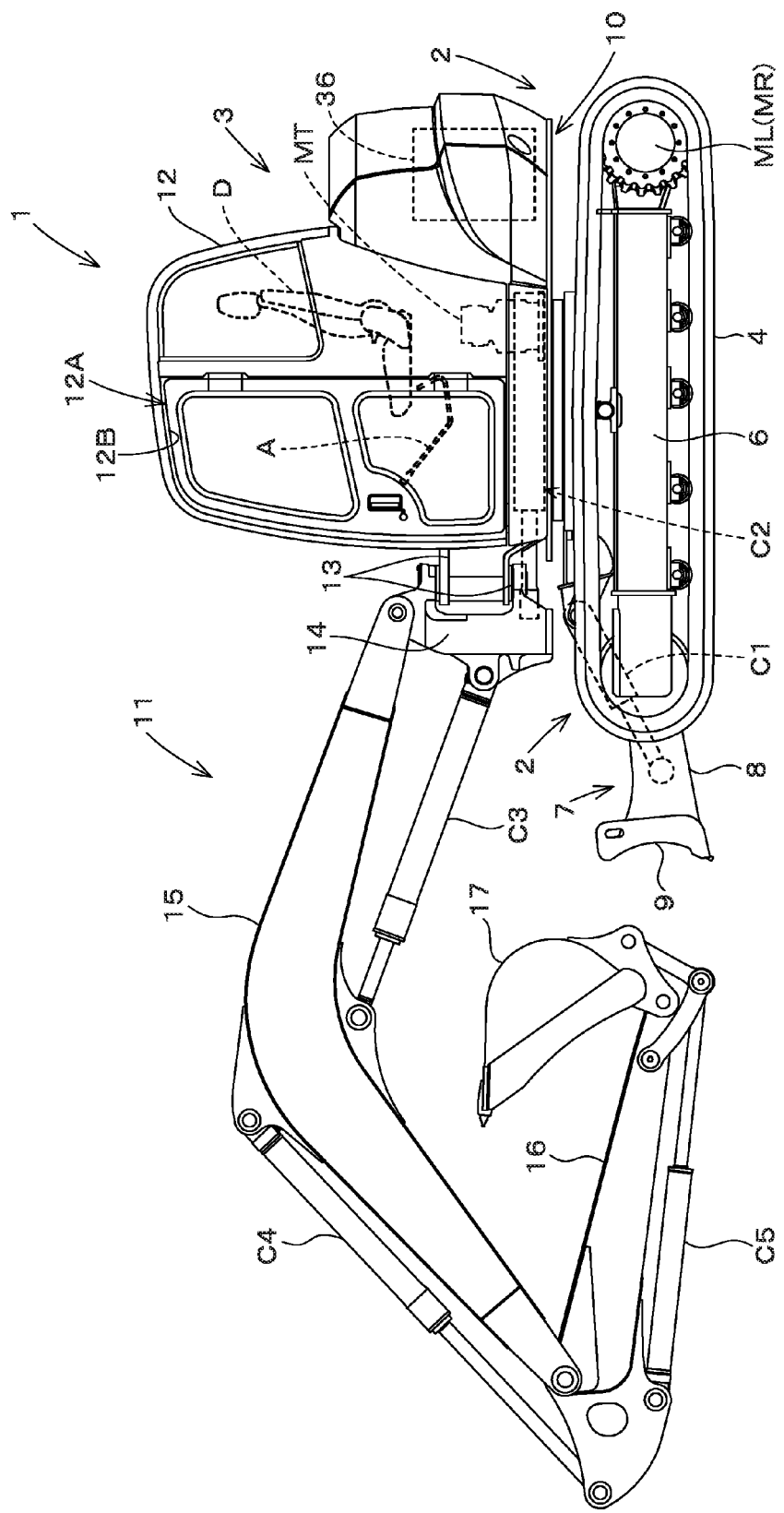
FIG. 1 is a side view of a backhoe.

In the following, an embodiment of the present invention is described referring to the drawings. In FIG. 1, Reference sign 1 represents a backhoe (work machine), and the backhoe 1 is configured to mainly include a lower traveling body 2 and an upper revolving body 3 mounted on the traveling body 2.

The traveling body 2 is, on both of left and right sides of a truck frame 6, provided with crawler type traveling units 5 that are configured to circulate and rotationally drive endless belt shaped crawler belts 4 in circumferential directions by traveling motors ML and MR including hydraulic motors (hydraulic actuators), respectively.

On a front side of the truck frame 6, a dozer unit 7 is provided. The dozer unit 7 is adapted to be provided with a blade 9 on a front end side of a support arm 8 that is pivotally connected to the truck frame 6 at a rear end side and swingable up and down, and the support arm 8 is driven up and down by expansion and contraction of a dozer cylinder C1 including a hydraulic cylinder (hydraulic actuator).

The revolving body 3 is provided with: a revolving base 10 that is mounted on the truck frame 6 rotatably around a vertical pivot center; a front operating unit 11 that is equipped on a front side of the revolving base 10; and a cabin 12 that is mounted on the revolving base 10.

The revolving base 10 is provided with an engine 36, a radiator, a fuel tank, an operating oil tank, a battery, and the like, and revolvably driven by a revolving motor MT including a hydraulic motor (hydraulic actuator).

On the front side of the revolving base 10, support brackets 13 are provided with protruding forward from the revolving base 10, and the support brackets 13 support a swing bracket 14 swingably left and right around a vertical shaft center. The swing bracket 14 is swingably driven left and right by a swing cylinder C2 including a hydraulic cylinder (hydraulic actuator).

The front operating unit 11 is configured to mainly include: a boom 15 that is made swingable up and down by a base part side that is pivotally connected to an upper part of the swing bracket 14 so as to be rotatable around a lateral shaft; an arm 16 that is made swingable back and forth by being pivotally connected to a fore end side of the boom 15 so as to be rotatable around a lateral shaft; and a bucket 17 (operating tool) that is made swingable back and forth by being pivotally connected to a fore end side of the arm 16 so as to be rotatable around a lateral shaft.

The boom 15 is swingably driven by a boom cylinder C3 that is set between the boom 15 and the swing bracket 14; the arm 16 is swingably driven by an arm cylinder C4 that is set between the arm 16 and the boom 15; and the bucket 17 is swingably driven by a bucket cylinder C5 (operating tool cylinder) that is set between the bucket 17 and the arm 16.

The boom cylinder C3, arm cylinder C4, and bucket cylinder C5 are configured to include hydraulic cylinders (hydraulic actuators), respectively.

In a rear part inside the cabin 12, an operator's seat D is provided. Also, on a front side of a left side face of the cabin 12, a doorway 12B that can be opened/closed by an operator's door 12A is provided, and on a left side of the operator's seat D, an unloading lever A arranged across the doorway 12B is provided with being pullable.

The unloading lever A is configured to, by being pulled up when an operator gets out of the backhoe 1, enable a position thereof to be changed to a position not preventing the operator from getting on/out, and also unable any of the various types of hydraulic actuators ML, MR, MT, and C1 to C5 equipped in the backhoe 1 from being operated.

Figure 2:
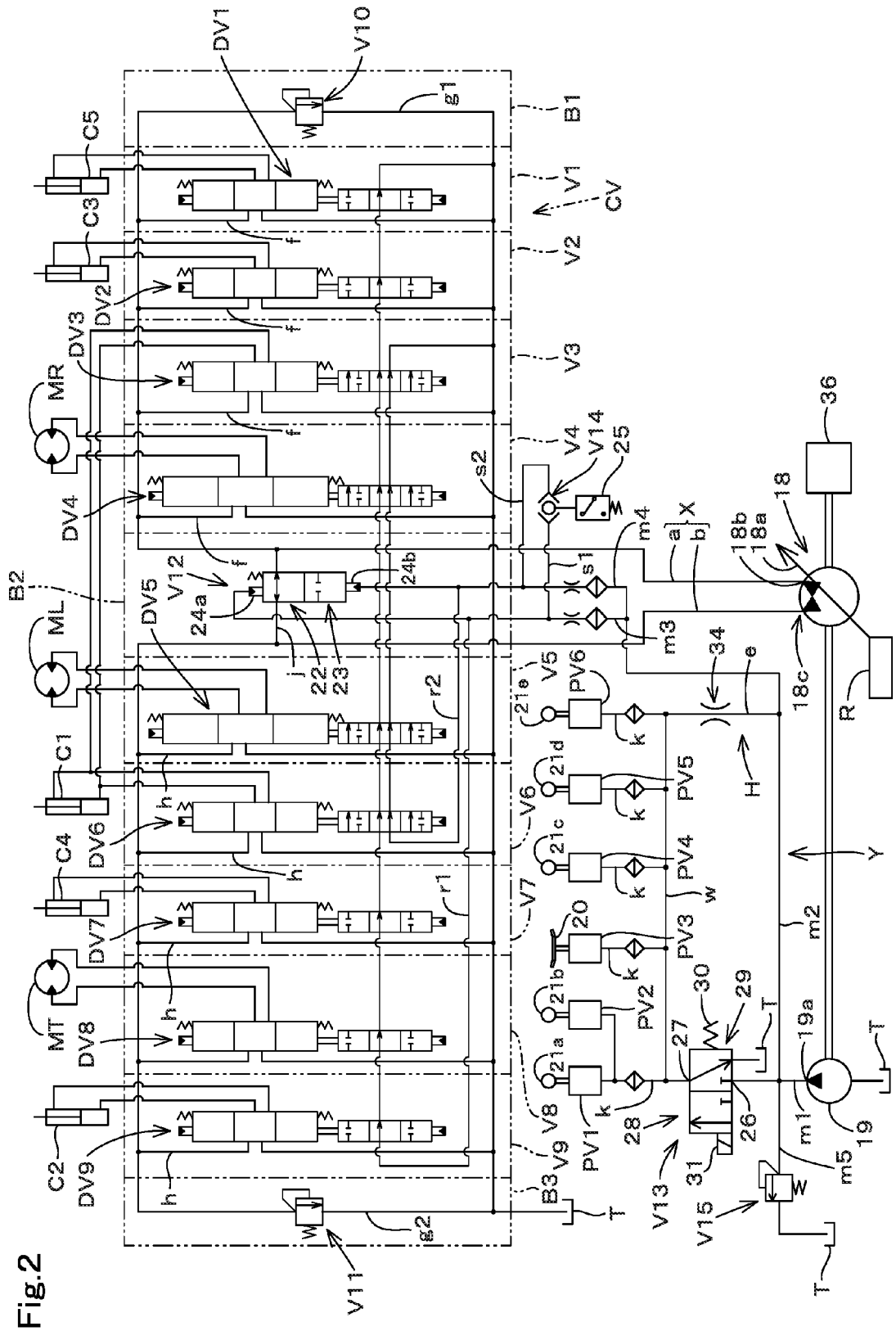
FIG. 2 is a hydraulic circuit diagram of the backhoe.
Figure 3:
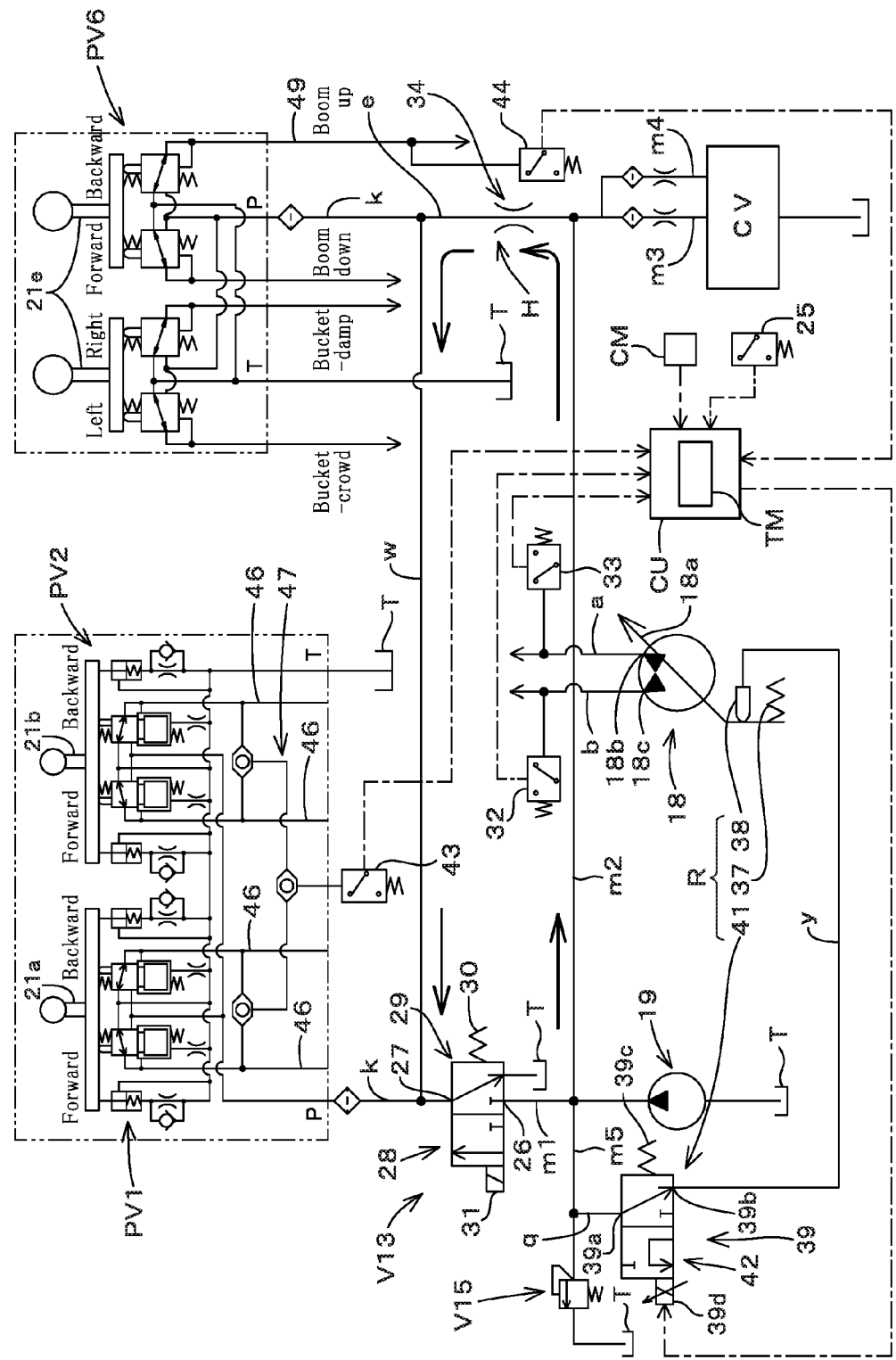
FIG. 3 is a hydraulic circuit diagram of a main part.

Next, referring to FIGS. 2 and 3, a hydraulic system for operating the various types of hydraulic actuators ML, MR, MT, and C1 to C5 equipped in the backhoe 1 is described.

The hydraulic system of the backhoe 1 has: a control valve CV that controls the various types of hydraulic actuators ML, MR, MT, and C1 to C5; a main pump 18 for supplying operating oil that operates the various types of hydraulic actuators ML, MR, MT, and C1 to C5; and a pilot pump 19 for supplying pilot pressure oil for controlling pilot operated directional control valves, and signal pressure oil for pressure detection signals and the like.

The control valve CV is, in the present embodiment, adapted to sequentially arrange (in FIG. 2, sequentially arrange from right): a first block B1; a bucket control valve V1 that controls the bucket cylinder C5; a boom control valve V2 that controls the boom cylinder C3; a first dozer control valve V3 that controls the dozer cylinder C1; a right traveling control valve V4 that controls the traveling motor MR of the right side traveling unit 5; a second block B2 for introducing the pressure oil; a left traveling control valve V5 that controls the traveling motor ML of the left side traveling unit 5; a second dozer control valve V6 that controls the dozer cylinder C1; an arm control valve V7 that controls the arm cylinder C4; a revolution control valve V8 that controls the revolving motor MT; a swing control valve V9 that controls the swing cylinder C2; and a third block B3, and also mutually connect them.

The respective control valves V1 to V9 have directional control valves DV1 to DV9 incorporated in valve bodies.

Each of the directional control valves DV1 to DV9 is one that switches a direction of the pressure oil for a corresponding one of the hydraulic actuators ML, MR, MT, and C1 to C5 as a control object, and configured to include a direct acting spool type directional control valve as well as including a pilot operated directional control valve subjected to a pilot operation (subjected to a switching operation by the pilot pressure).

Also, each of the directional control valves DV1 to DV9 of the control valves V1 to V9 is configured such that a spool thereof is moved in proportion to an operation amount of a corresponding one of remote control valves PV1 to PV6 performing the pilot operations of the directional control valves DV1 to DV9, and the pressure oil having an amount proportional to a moved amount of the spool is supplied to a corresponding one of the hydraulic actuators ML, MR, MT, and C1 to C5 as a control object (in other words, in proportion to the operation amount of a corresponding one of the remote control valves PV1 to PV6, an operation speed of a corresponding one of the hydraulic actuators ML, MR, MT, and C1 to C5 as a control object is made variable).

Each of the remote control valves PV1 to PV6 is configured to include a pilot valve that outputs pilot pressure proportional to an operation amount from a secondary side port (output port) and sends the pilot pressures to a pilot pressure receiving part of a corresponding at least one of the directional control valves DV1 to DV8 as an operational object.

As the remote control valves PV1 to PV6, the left traveling remote control valve PV1 that operates the directional control valve DV5 of the left traveling control valve V5; the right traveling remote control valve PV2 that operates the directional control valve DV4 of the right traveling control valve V4; the swing remote control valve PV3 that operates the directional control valve DV9 of the swing control valve V9; the dozer remote control valve PV4 that operates the directional control valve DV3 of the first dozer control valve V3 and the directional control valve DV6 of the second dozer control valve V6; the revolution/arm remote control valve PV5 that operates the directional control valve DV8 of the revolution control valve V8 and the directional control valve DV7 of the arm control valve V7; and bucket/boom remote control valve PV6 that operates the directional control valve DV1 of the bucket control valve V1 and the directional control valve DV2 of the boom control valve V2 are provided.

In the present embodiment, the swing remote control valve PV3 is operated with an operation pedal 20, and the other remote control valves PV1, PV2, and PV4 to PV6 are operated with operation levers 21a to 21e (operation members), any of which is adapted to be operable from a position where the operator sits on the operator's seat D.

Also, the directional control valve DV3 of the first dozer control valve V3 and the directional control valve DV6 of the second dozer control valve V6 are simultaneously operated by the one dozer remote control valve PV3.

The operation levers 21a and 21b (traveling operation members) for operating the left and right remote control valves PV1 and PV2 are operated back and forth from neutral positions, and in the case of pushing each of the operation levers 21a and 21b forward, a corresponding one of the traveling units 2 as an operational object is driven forward, whereas in the case of pulling it backward, the traveling unit 2 as an operational object is driven backward.

The operation levers 21d and 21e respectively for operating the revolution/arm remote control valve PV5 and the bucket/boom remote control valve PV6 are adapted to be operable in two directions, i.e., a longitudinal direction and a lateral direction (adapted to be operable back and forth and left and right from neutral positions).

Regarding the revolution/arm remote control valve PV5, by operating the operation lever 21d in one direction (e.g., the lateral direction), the directional control valve DV8 of the revolution control valve V8 is operated, whereas by an operation in the other direction (e.g., the longitudinal direction), the directional control valve DV7 of the arm control valve V7 is operated.

Also, regarding the bucket/boom remote control valve PV6, by operating the operation lever 21e (boom operation member) in one direction (e.g., the lateral direction), the directional control valve DV1 of the bucket control valve V1 is operated, whereas by an operation in the other direction (e.g., the longitudinal direction), the directional control valve DV2 of the boom control valve V2 is operated.

Further, by tiling each of the operation levers 21*d* and 21*e* respectively for the remote control valves PV5 and PV6 in an oblique direction between the longitudinal and lateral directions, a combined operation can be performed.

In the first and third blocks B1 and B3, relief valves V10 and V11 are respectively incorporated, and in the second block B2, a traveling independent valve 12 is incorporated.

The main pump 18 and pilot pump 19 are driven by (a driving source such as) the engine 36 mounted on the revolving base 10.

The main pump 18 is configured to include a variable capacity hydraulic pump provided with a pump capacity control mechanism such as a swash plate 18*a*, and in the present embodiment, configured to include a swash plate type variable capacity axial pump having a function as an equal flow rate double pump that discharges equal amounts of pressure oil from two independent discharge ports 18*b* and 18*c*. In detail, as the main pump 18, a split flow type hydraulic pump having a mechanism that alternately discharges the pressure oil from one piston and cylinder barrel kit to discharge grooves formed inside and outside of a valve plate is employed.

Note that the main pump maybe configured to include one or more single flow type hydraulic pumps.

A discharging circuit X for the main pump 18 is configured to include: a first main discharge passage a that is connected to the first discharge port 18*b* of the main pump 18; and a second main discharge passage b that is connected to the second discharge port 18*c* of the main pump 18, and the first and second discharge passages a and b are both drawn into the second block B2.

The first discharge passage a is placed so as to reach the first block B1 from the second block B2 through the valve body of the right traveling control valve V4→the valve body of the first dozer control valve V3→the valve body of the boom control valve V2→the valve body of the bucket control valve V1, and a flow passage terminal thereof is connected to the relief valve V10.

The present embodiment is adapted to be able to supply the pressure oil from the first discharge passage a to the respective directional control valves DV4, DV3, DV2, and DV1 of the right traveling control valve V4, first dozer control valve V3, boom control valve V2, and bucket control valve V1 through pressure oil branching passages f, respectively.

The second discharge passage b is placed so as to reach the third block B3 from the second block B2 through the valve body of the left traveling control valve V5→the valve body of the second dozer control valve V6→the valve body of the arm control valve V7→the valve body of the revolution control valve V8→the valve body of the swing control valve V9, and a flow passage terminal thereof is connected to the relief valve V11.

The present embodiment is adapted to be able to supply the pressure oil from the second discharge passage b to the respective directional control valves DV5, DV6, DV7, DV8, and DV9 of the left traveling control valve V5, second dozer control valve V6, arm control valve V7, revolution control valve V8, and swing control valve V9 through pressure oil branching passages h, respectively.

The control valve CV is provided with drain oil passages g1 and g2 connected to the respective relief valves V10 and V11, and the respective drain oil passages g1 and g2 are joined together in the third block B3, and placed toward a tank T.

The first discharge passage a and the second discharge passage b are, in the second block B2, connected to each other through a communicatively connecting passage j that crosses the traveling independent valve V12.

The traveling independent valve V12 is configured to include a direct acting spool type directional control valve as well as including a pilot operated directional control valve subjected to a switching operation by pilot pressure.

The traveling independent valve V12 is adapted to be switchable between a joining position 22 allowing the pressure oil to circulate through the communicatively connecting passage j and an independent supply position 23 blocking the pressure oil from circulate through the communicatively connecting passage j, and biased by a spring in a direction to be switched to the joining position 22.

In the case where the traveling independent valve V12 is at the joining position 22, the discharged oil from the first discharge port 18*c* and the discharged oil from the second discharge port 18*b* are joined together to be made suppliable to the directional control valves DV1 to DV9 of the respective control valves V1 to V9.

On the other hand, in the case where the traveling independent valve V12 is switched to the independent supply position 23, the discharged oil from the first discharge port 18*b* is made suppliable to the respective directional control valves DV4 and DV3 of the right traveling control valve V4 and first dozer control valve V3, and also the pressure oil from the second discharge port 18*c* is made suppliable to the respective directional control valve DV5 and DV6 of the left traveling control valve V5 and second dozer control valve V6.

The pilot pump 19 is configured to include a constant capacity gear pump. A discharging circuit Y for the pilot pump 19 is configured to include first to fifth pilot discharge passages m1, m2, m3, m4, and m5.

The first pilot discharge passage m1 is connected to a discharge port 19*a* of the pilot pump 19 at a starting end thereof, and also connected to a primary side port 26 of an unloading valve V13 at a terminal thereof.

The second pilot discharge passage m2 is connected to the first pilot discharge passage m1 at a starting end thereof, and also connected to starting ends of the third and fourth discharge passages m3 and m4 at a terminal side thereof.

The third and fourth pilot discharge passages m3 and m4 are drawn into the second block B2, in which a terminal of the third pilot discharge passage m3 is connected to one 24*a* of pressure receiving parts of the traveling independent valve V12, and a terminal of the fourth pilot discharge passage m4 is connected to the other pressure receiving part 24*b* of the traveling independent valve V12.

The fifth pilot discharge passage m5 is connected to the first pilot discharge passage m1 at a starting end thereof, and also at a terminal thereof, connected to a relief valve V15 that sets a maximum pressure of the discharging circuit Y for the pilot pump 19.

Further, the third pilot discharge passage m3 is connected with a starting end of a first detecting oil passage r1, and the fourth pilot discharge passage m4 is connected with a starting end of a second detecting oil passage r2.

The first detecting oil passage r1 is connected to the drain oil passage g1 through the directional control valve DV9 of the swing control valve V9→the directional control valve DV8 of the revolution control valve V8→the directional control valve DV7 of the arm control valve V7→the directional control valve DV6 of the second dozer control valve V6→the directional control valve DV5 of the left traveling control valve V5→the directional control valve DV4 of the right traveling control valve V4→the directional control valve DV3 of the first dozer control valve V3→the directional control valve DV2 of the boom control valve V2→the directional control valve DV1 of the bucket control valve V1.

The second detecting oil passage r2 is connected to the drain oil passage g1 through the directional control valve DV6 of the second dozer control valve V6→the directional control valve DV5 of the left traveling control valve V5→the directional control valve DV4 of the right traveling control valve V4→the directional control valve DV3 of the first dozer control valve V3.

The traveling independent valve V12 is, in the case where the directional control valves DV1 to DV9 of the respective control valves V1 to V9 are neutral, retained at the joining position 22 by force of the spring.

Also, in the case where any of the respective directional control valves DV6, DV7, DV5, and DV8 of the right traveling control valve V4, left traveling control valve V5, first dozer control valve V3, and second dozer control valve V6 is operated from a neutral position, pressure is applied to the inside of the second detecting oil passage r2, and thereby the traveling independent valve V12 is switched from the joining position 22 to the independent supply position 23.

At this time, in the case where any of the directional control valves DV11, DV10, DV9, DV4, DV3, DV2, and DV1 of the bucket control valve V1, boom control valve V2, revolution control valve V8, arm control valve V7, and swing control valve V9 is operated from a neutral position, pressure is applied to the inside of the first detecting oil passage r1, and thereby the traveling independent valve V12 is switched from the independent supply position 23 to the joining position 22.

Also, the third pilot discharge passage m3 is connected with a first sensing oil passage s1; the fourth pilot discharge passage m4 is connected with a second sensing oil passage s2; terminals of the first and second sensing oil passages s1 and s2 are connected to a shuttle valve V14; the shuttle valve V14 is connected with a pressure switch 25; and the pressure switch 25 is, through a transmission line, connected to a control unit CU that controls the engine 36, the main pump 18, and the like.

The hydraulic system of the present embodiment is provided with an auto-idling control system (AI system) that automatically operates an accelerator device for the engine 36.

In the auto-idling control system, in the case where the directional control valves DV1 to DV9 of the respective control valves V1 to V9 are neutral, pressure is applied to neither the inside of the first detecting oil passage r1 nor the inside of the second detecting oil passage r2, so that the pressure switch 25 does not perform a pressure sensing-based operation, and in this state, a governor of the engine 36 is automatically controlled by an electrical actuator or the like so as to decelerate to a preset idling position. Also, in the case where at least any one of the directional control valves DV1 to DV9 of the control valves V1 to V9 is operated, pressure is applied to the inside of the first detecting oil passage r1 or the inside of the second detecting oil passage r2, and the pressure switch 25 senses the pressure to perform the pressure sensing-based operation. In doing so, a command signal is issued from the control unit CU to the electrical actuator or the like, and the governor is automatically controlled by the electrical actuator or the like so as to accelerate to a set acceleration position.

A secondary side port 27 of the unloading valve V13 is connected with a starting end of a pilot pump oil passage w, and the pilot pump oil passage w is connected with primary side ports (input ports) of the respective remote control valves PV1 to PV6 through supply oil passages k (the respective remote control valves PV1 to PV6 are connected to the pilot pump oil passage w in parallel).

Accordingly, discharged oil from the pilot pump 19 is sent to the pilot pump oil passage w through the unloading valve V13, and from the pilot pump oil passage w, the pressure oil is supplied to the primary side ports of the respective remote control valves PV1 to PV6.

The unloading valve V13 is configured to include a direct acting spool type two-position switching solenoid valve that is switchable between a supply position 28 where the first pilot discharge passage m1 (the discharging circuit Y for the pilot pump 19) is communicatively connected to the starting end of the pilot pump oil passage w and an unloading position 29 where the communicative connection between the first pilot discharge passage m1 (the discharging circuit Y for the pilot pump 19) and the starting end of the pilot pump oil passage w is blocked and also the starting end of the pilot pump oil passage w is communicatively connected to the tank T.

The unloading valve V13 is biased by a spring 30 in a direction to be switched to the unloading position 29, and by demagnetizing a solenoid 31, the unloading valve V13 is brought to the unloading position 29, whereas by magnetizing the solenoid 31, the unloading valve V13 is switched to the supply position 28. The solenoid 31 of the unloading valve V13 is magnetized at a position to which the unloading lever A arranged on the left side of the operator's seat D is moved down, and demagnetized by pulling up the unloading lever A.

Accordingly, by pulling up the unloading lever A at the time of getting out of the backhoe 1, the unloading valve V13 is switched to the unloading position 29 to prevent the pressure oil from being supplied to the respective remote control valves PV1 to PV6, and thereby the respective hydraulic actuators ML, MR, MT, and C1 to C5 are disabled from being operated.

The hydraulic system is, in order to improve responsiveness of the respective remote control valves PV1 to PV6 performing the pilot operations of the directional control valves DV1 to DV9 of the respective control valves V1 to V9 at the time of low temperature, provided with a warm-up circuit H for warming the oil inside the pilot pump oil passage w at the time of a warm-up operation of the backhoe 1.

The warm-up circuit H is configured to include: a connecting oil passage e that connects a terminal of the pilot pump oil passage w and the discharging circuit Y for the pilot pump 19 (in the illustrated example, the second pilot discharge passage m2) to each other; and a restriction (flow rate limiting means) 34 that is set in the middle of the connecting oil passage e.

At the time of performing the warm-up operation of the backhoe 1, the warm-up operation is performed with the unloading lever A being pulled up to bring the unloading valve V13 to the unloading position 29.

In doing so, the oil discharged from the pilot pump 19 first flows from the discharging circuit Y to the terminal of the pilot pump oil passage w through the connecting oil passage e of the warm-up circuit H. Then, the discharged oil from the pilot pump 19, which has flowed into the terminal of the pilot pump oil passage w, flows through the pilot pump oil passage w toward the starting end side, and is, from the starting end, discharged to the tank T through the unloading valve V13.

That is, the oil sucked up from the tank T by the pilot pump 19 circulates to the tank T through the pilot pump oil passage w, and therefore the oil inside the pilot pump oil passage w is warmed.

This causes the oil, which is to be supplied to the primary side ports of the remote control valves PV1 to PV6, to be warmed near the primary side ports, and therefore the low temperature responsiveness of the remote control valves PV1 to PV6 can be ensured (low temperature operability of the remote control valves PV1 to PV6 can be ensured).

Also, the oil having been sucked up from the tank T and discharged from the pilot pump 19 is circulated through the pilot pump oil passage w toward the tank T, so that a sufficient warm-up effect can be obtained, and also a warm-up time can be shortened.

Further, the second pilot discharge passage m2 for sending the discharged oil from the pilot pump 19 to the control valve CV is also promptly warmed at the same time, and therefore the effect is produced also on warming up the oil inside a signal circuit of the auto-idling control system and the first and second detecting oil passages r1 and r2.

Still further, the restriction 34 provided in the warm-up circuit H limits a flow rate of the oil flowing from the discharging circuit Y for the pilot pump 19 to the pilot pump oil passage w through the connecting oil passage e so as to, in a state where the unloading valve V13 is switched to the unloading position 29, prevent any of the hydraulic actuators ML, MR, MT, and C1 to C5 as an operational object from being activated even in the case of operating a corresponding one of the remote control valves PV1 to PV6 (so as to prevent pressure enough to perform the pilot operation of a corresponding one of the directional control valves DV1 to DV9 from being applied to a secondary side port of the remote control valves PV1 to PV6).

Accordingly, even in the case of, in the state where the unloading valve V13 is brought to the unloading position 29, circulating the discharged oil from the pilot pump 19 to the pilot pump oil passage w through the warm-up circuit H, any of the control valves V1 to V9 is not operated by a corresponding one of the remote control valves PV1 to PV6. Also, in a state where the unloading valve V13 is brought to the supply position 28, the discharged oil from the pilot pump 19 flows to the pilot pump oil passage w through the unloading valve V13 as normal to enable each of the control valves V1 to V9 to be operated by a corresponding one of the remote control valves PV1 to PV6, and therefore the flow rate is not wasted.

Further, in the case of operating any of the remote control valves PV1 to PV6 to output secondary side pressure, the unloading valve V13 is switched to the supply position 28, and the discharged oil from the pilot pump 19 is supplied to the pilot pump oil passage w from the starting end side; however, the warm-up circuit H connects the discharging circuit Y for the pilot pump 19 to the terminal of the pilot pump oil passage w, and therefore does not cause a delay in response at the time of operating the remote control valves PV1 to PV6.

Also, the flow rate limiting means adapted to limit the flow rate of the oil flowing from the discharging circuit Y for the pilot pump 19 to the pilot pump oil passage w through the connecting oil passage e is configured to include the restriction 34, and can be thereby provided at low cost.

Further, the pilot pump oil passage w is normally formed to include the hydraulic hose; however, providing the warm-up circuit H enables fluidity of the oil inside the pilot pump oil passage w at the time of low temperature to be improved, so that the hydraulic hose constituting the pilot pump oil passage w can be downsized, and the downsizing enables cabling of the hydraulic hose at the time of placing the hydraulic hose constituting the pilot pump oil passage w to be easily performed.

Figure 5:
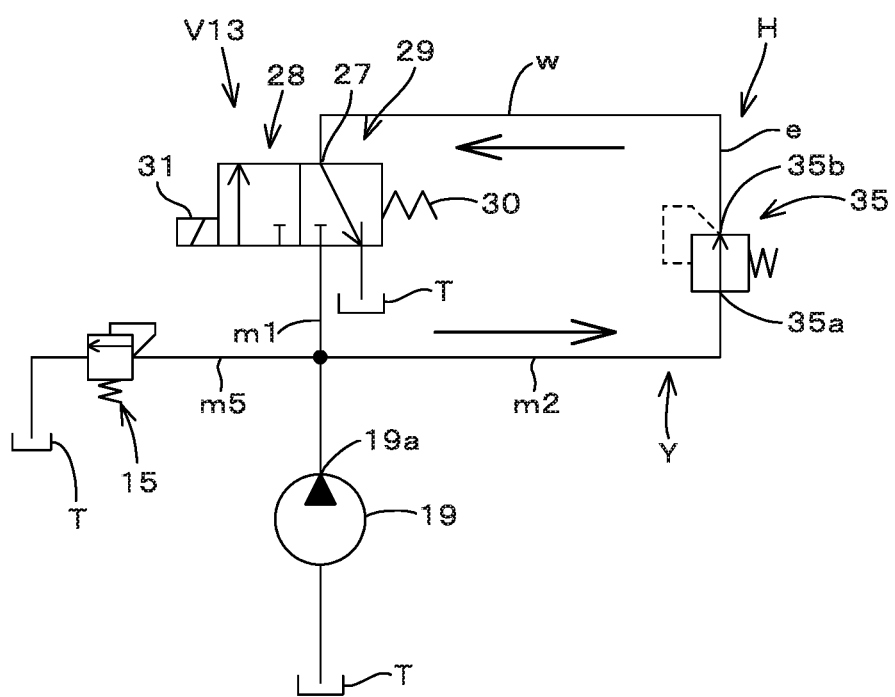
FIG. 5 is a hydraulic circuit diagram illustrating another embodiment.

Note that the flow rate limiting means adapted to limit the flow rate of the oil flowing from the discharging circuit Y for the pilot pump 19 to the pilot pump oil passage w through the connecting oil passage e is not limited to the restriction 34. That is, the flow rate limiting means is only required to be one that can limit the flow rate of the oil flowing from the discharging circuit Y for the pilot pump 19 to the pilot pump oil passage w through the connecting oil passage e so as to prevent any of the hydraulic actuators ML, MR, MT, and C1 to C5 as an operational object from being activated even in the case of operating a corresponding one of the remote control valves PV1 to PV6 in the state where the unloading valve V13 is switched to the unloading position 29, and the flow rate limiting means may be configured to include, for example, a pressure reducing valve 35 as illustrated in FIG. 5.

In the case of this embodiment, a primary side port 35a (high pressure side port) of the pressure reducing valve 35 is connected to an oil passage e1 on the discharging circuit Y side of the connecting oil passage e, and a secondary side port 35b (reduced pressure side port) of the pressure reducing valve 35 is connected to an oil passage e2 on the pilot pump oil passage w side of the connecting oil passage e. Also, the pressure reducing valve 35 is pressed by pressure at the secondary side port 35b in a direction in which a spool is opened, and also biased by a spool spring 35c in a direction in which the spool is closed.

Spring pressure of the spool spring 35c of the pressure reducing valve 35 is set such that the pressure at the secondary side port 35b of the pressure reducing valve 35 becomes a pressure that, in the state where the unloading valve V13 is switched to the unloading position 29, prevents any of the hydraulic actuators MT, MR, MT, and C1 to C5 as an operational object from being activated even in the case of operating a corresponding one of the remote control valves PV1 to PV6.

Also, in the hydraulic system of the present embodiment, to prevent an absorption torque of the main pump 18 from exceeding a setting value (maximum absorption torque), torque control that limits the maximum absorption torque of the main pump 18 is performed, and the setting value for the maximum absorption torque is made settable to a plurality of setting values.

The torque control that limits the maximum absorption torque of the main pump 18 is performed by changing a tilt angle of the swash plate 18a of the main pump 18 so as to, with increasing discharge pressures of the main pump 18, decrease a capacity of the main pump 18.

As illustrated in FIG. 3, the discharge pressures of the main pump 18 are detected by discharge pressure detectors 32 and 33 that are connected to the first and second discharge passages a and b and include pressure switches, respectively. Detection signals of the discharge pressure detectors 32 and 33 are transmitted to the control unit CU through transmission lines, respectively.

The tilt angle of the swash plate 18a of the main pump 18 is controlled by a regulator R.

The regulator R is, in the present embodiment, adapted to be provided with: a swash plate spring 37 that biases the swash plate 18a; a swash plate actuator 38 that presses the swash plate 18a; and a swash plate control valve 39 that controls pressing force of the swash plate actuator 38. The tilt angle of the swash plate 18a of the main pump 18 is controlled by biasing force of the swash plate spring 37 and the pressing force of the swash plate actuator 38.

Note that the regulator R described in the present embodiment is only exemplified, and in addition to the regulator R having an exemplified configuration, a publicly-known regulator that controls a swash plate or the like of a variable capacity hydraulic pump can be employed.

The swash plate control valve 39 is configured to include an electromagnetic proportional pressure reducing valve, and controlled by output current outputted from the control unit CU.

A primary side port 39a of the swash plate control valve 39 is connected to the discharging circuit Y for the pilot pump 19 (in the illustrated example, the fifth pilot discharge passage m5) through a communicatively connecting passage q, and a secondary side port 39b of the swash plate control valve 39 is connected to the swash plate actuator 38 through a control oil passage y.

The swash plate control valve 39 has: a spring 39c that biases a spool in a direction in which the spool is moved toward a communicatively connecting position 41 side where the primary and secondary side ports 39a and 39b are communicatively connected to each other; and a proportional solenoid 39d that moves the spool toward a blocking position 42 side (generates force against biasing force of the spring) where the communicative connection between the primary and secondary side ports 39a and 39b is blocked and also the secondary side port 35b is communicatively connected to the tank T.

Further, the swash plate control valve 39 is controlled such that as the output current (magnetizing current) outputted from the control unit CU to the proportional solenoid 39d is increased, secondary side pressure outputted to the swash plate actuator 38 decreases (pressing force of the swash plate actuator 38 decreases).

Also, depending on the discharge pressures of the main pump 18, which have been detected by the pressure switches 32 and 33 and inputted to the control unit CU, a command signal is outputted from the control unit CU to the proportional solenoid 39d of the swash plate control valve 39 to control the swash plate 18a such that the maximum absorption torque of the main pump 18 becomes a set maximum absorption torque setting value.

The control unit CU has maximum absorption torque setting means TM adapted to set the maximum absorption torque setting value of the main pump 18.

The maximum absorption torque setting means TM is set with a plurality of torque positions respectively for different maximum absorption torque setting values, and adapted to be able to change the maximum absorption torque setting value to a maximum absorption torque setting value set by a corresponding one of the torque positions.

Regarding the torque positions, in the present embodiment, a setting value of the maximum absorption torque of the main pump 18 can be changed to any of the maximum absorption torque setting values set by three torque positions, i.e., a P position (power mode), an E1 position (low economy mode) corresponding to the maximum absorption torque setting value smaller than that corresponding to the P position, and an E2 position (high economy mode) corresponding to the maximum absorption torque setting value smaller than that corresponding to the E1 position.

In the case of the backhoe 1, as illustrated in FIG. 4B, at the P position, for example, the maximum absorption torque setting value is set to a value near a maximum torque value in output torque characteristics of the engine 36 (set not to exceed the maximum torque value); at the E1 position, the maximum absorption torque setting value is set to 80% of the maximum absorption torque setting value at the P position; and at the E2 position, the maximum absorption torque setting value is set to 60% of the maximum absorption torque setting value at the P position.

Note that the backhoe 1 is used with a target revolution speed of the engine 36 being fixed to a desired target revolution speed, and the maximum absorption torque setting values at the respective torque positions are unchanged.

Mutual switching between the P position and the E2 position is made possible by switching means CM such as a manual switch, which is provided near the operator's seat D and manually operated. In the present embodiment, at the time of starting the engine 36, a torque position is automatically set to the E2 position, and the switching means CM can switch from the E2 position to the P position as well as switching from the P position to the E2 position.

Accordingly, basically, work is done at the E2 position where an output of the main pump 18 is small, and therefore a fuel consumption can be suppressed (good fuel efficiency).

Also, in the case where fast working and traveling speeds are required, by switching to the P position where the output of the main pump 18 is high, the front operating unit 11, dozer unit 7, revolving base 10, swing bracket 14, and traveling motors ML and MR can be driven at a high speed level.

Mutual switching between the E2 position and the E1 position is automatically performed.

In the present embodiment, at the time of, in any of front and back directions, performing a full operation (refers to operating an operation lever to an operation terminal position (stroke end)) of at least one of the operation levers 21a and 21b for operating the left and right traveling remote control valves PV1 and PV2; at the time of, in a boom up direction, performing the full operation of the operation lever 21e for operating the bucket/boom remote control valve PV6; or at the time of, in any of the front and back directions, performing the full operation of at least one of the operation levers 21a and 21b for operating the left and right remote control valves PV1 and PV2, and in the boom up direction, performing the full operation of the operation lever 21e for operating the bucket/boom remote control valve PV6, switching from the E2 position to the E1 position is made.

Detection of the full operation of at least one of the operation levers 21a and 21b for the left and right traveling remote control valves PV1 and PV2 is performed by a traveling operation detector 43, and detection of the full operation of the operation lever 21e for the bucket/boom remote control valve PV6 in the boom up direction is performed by a boom operation detector 44. The detectors 43 and 44 are, in the present embodiment, configured to include pressure switches, respectively.

The traveling operation detector 43 is, through a connecting circuit 47, connected to traveling command oil passages 46 that send the pilot pressure to the left and right traveling control valves V5 and V4 from the left and right traveling remote control valves PV1 and PV2, and configured to, by detecting the pressures (secondary side pressures of the remote control valves PV1 and PV2) in the traveling command oil passages 46, detect the full operation of at least one operation lever 21a or 21b of the two traveling operation levers 21a and 21b.

The boom operation detector 44 is connected to a boom up command oil passage 49 that sends the pilot pressure to a boom up operation side pressure receiving part of the directional control valve DV2 of the boom control valve V2 from the bucket/boom remote control valve PV6, and configured to, by detecting the pressure (secondary side pressure at a port of the remote control valve PV6, which outputs a boom up command) in the boom up command oil passage 49, detect the full operation of the operation lever 21e toward the boom up side.

The traveling operation detector 43 and the boom operation detector 44 are connected to the control unit CU through transmission lines, respectively, and detection signals of the traveling and boom operation detectors 43 and 44 are inputted to the control unit CU.

As illustrated in FIG. 4A, during switching to the P position, even in the case where the traveling operation detector 43 and the boom operation detector 44 are any of on and off (which respectively refer to states where each of the detectors has or has not detected the full operation), the P position remains unchanged (operation pattern 1).

Also, in the case where the torque position is the E2 position, and one of the traveling and boom operation detectors 43 and 44 is on and the other one is off (operation patterns 2 and 3), or the both are on (operation pattern 4), the torque position is switched to the E1 position.

Further, in the case where both of the traveling and boom operation detectors 43 and 44 are off, and the torque position is the E2 position, the E2 position remains unchanged (operation pattern 5).

Figure 4C:
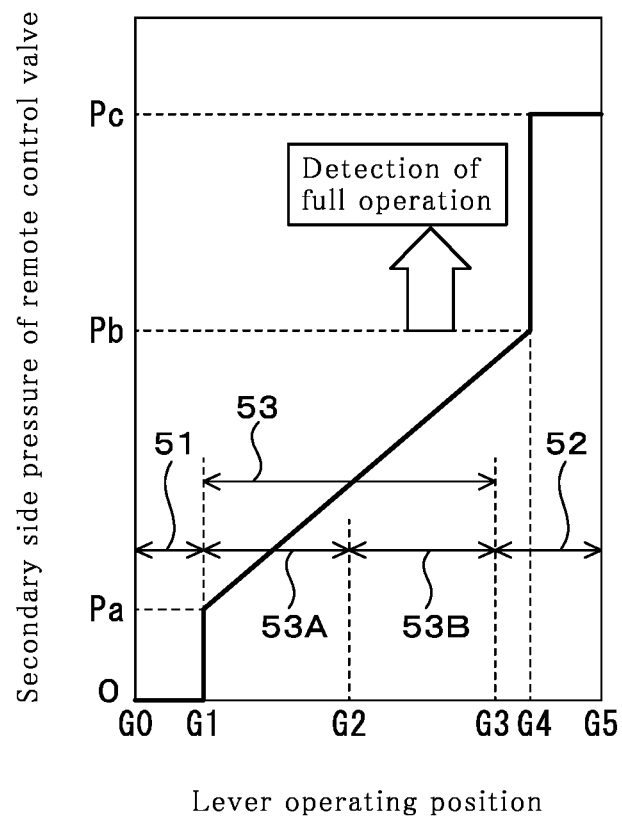
FIG. 4C is a characteristic diagram of secondary side pressure of a remote control valve with respect to an operating position of an operation lever.

Next, the above-described detection of the full operation of each of the operation levers 21a, 21b, and 21e is described referring to FIG. 4C.

FIG. 4C is a characteristic diagram representing a change in secondary side pressure of each of the remote control valves PV1, PV2, and PV6 with respect to a lever operating position of a corresponding one of the operation levers 21a, 21b, and 21e, in which the vertical axis takes the secondary side pressure of the remote control valve PV1, PV2, or PV6, and the horizontal axis takes the lever operating position of the operation lever 21a, 21b, or 21e.

The secondary side pressure increases with increasing distance from the origin.

Regarding the lever operating position, the origin is an operation starting end position (neutral position, G0 position) corresponding to a starting end position of a lever stroke, and with increasing distance from the origin, the lever operating position comes close to an operation terminal position (G5 position) corresponding to a terminal position of the lever stroke.

An operational region of the operation lever 21a, 21b, or 21e is divided into: a neutral region 51 where an operational object does not operate (in the illustrated example, a region from the G0 position to a G1 position); a full operation vicinity region near the operation terminal (in the illustrated example, a region from a G3 position to the G5 position); and an intermediate region 53 between the neutral region 51 and the full operation vicinity region 52 (in the illustrated example, a region from the G1 position to the G3 position). Further, the intermediate region 53 is divided into: a very low speed region 53A from the G1 position to a G2 position; and an intermediate speed region 53B from the G2 position to the G3 position.

In the neutral region, even in the case of operating the operation lever 21a, 21b, or 21e, the secondary side pressure is not applied, and therefore a corresponding one of the left traveling control valve V5, right traveling control valve V4, and boom control valve V2 does not operate.

In the full operation vicinity region 52, it is not necessary to adjust a speed of the operational object, and accordingly, the operation lever 21a, 21b, or 21e is operated to the operation terminal position (G5 position) without stopping on the way.

In the intermediate region 53, by stopping the operation lever 21a, 21b, or 21e at an arbitrary position within the region, or changing a position, the speed of the operational object is adjusted to an operator's desired speed.

For example, ratios to the lever stroke in the above respective operational regions 51, 53A, 53B, and 52 are approximately:
Neutral region 51: 0% or more and less than 15%,
Very low speed region 53A: 15% or more and less than 45%,
Intermediate speed region 53B: 45% or more and less than 75%, and
Full operation vicinity region 52: From 75% to 100% inclusive.

In the characteristic diagram illustrated in FIG. 4C, in the case of operating the operation lever 21a, 21b, or 21e from the G0 position to the G1 position, the secondary side pressure (Pa) is generated; and in the case of operating the operation lever 21a, 21b, or 211e from the G1 position to a G4 position, the secondary side pressure rises from Pa to Pb in proportion to an operation amount of the operation lever 21a, 21b, or 21e, and by the secondary side pressure (Pb), the spool of the directional control valve DV2, DV4, or DV5, of the boom control valve V2, right traveling control valve V4, or left traveling control valve V5 is operated to the stroke end.

Also, at the G4 position, a primary side pressure takes a shortcut to flow to the secondary side, and the secondary side pressure rises from Pb to the highest output pressure of Pc at once. Further, during operating the operation lever 21a, 21b, or 21e from the G4 position to the G5 position, the secondary side pressure is constant at the highest output pressure (Pc).

In the present embodiment, the traveling operation detector 43 and the boom operation detector 44 are adapted to detect the full operations of the operation levers 21a, 21b, and 21e by detecting the secondary side pressures at the time when the operation levers 21a, 21b, and 21e are positioned near the operation terminals, respectively. Specifically, the traveling operation detector 43 and the boom operation detector 44 are adapted to detect the secondary side pressures (lowest secondary side pressures Pb at the G4 positions) at the time when the operation levers 21a, 21b, and 21e are positioned at the G4 positions (positions near the starting end positions G3 of the full operation vicinity regions 52), i.e., at the positions before the operation terminal positions of the operation levers 21a, 21b, and 21e.

As described above, in the full operation vicinity region 52, the operation lever 21a, 21b, or 21e is operated to the operation terminal position (G5 position) without stopping on the way, so that the G4 position is a waypoint at the time of performing the full operation of the operation lever 21a, 21b, or 21e, and therefore even in the case of detecting the full operation of the operation lever 21a, 21b, or 21e at the G4 position, no problem occurs.

The present embodiment is adapted to detect the full operations of the operation levers 21a, 21b, and 21e before the operation terminal positions of the operation levers 21a, 21b, and 21e, and therefore responsiveness of the switching from the E2 position to the E1 position with respect to the full operations of the operation levers 21a, 21b, and 21e is good.

Note that in the case of detecting the full operations of the operation levers 21a, 21b, and 21e before the operation levers 21a, 21b, and 21e are positioned at the operation terminal positions, the traveling operation detector 43 and the boom operation detector 44 may be adapted to detect secondary side pressures at the G3 positions, detect secondary pressures at positions between the G3 positions and the G4 positions, or detect secondary side pressures between Pb and Pc (or secondary side pressures near Pb) at the G4 positions.

Also, the present invention maybe adapted to, even though the operation levers 21a, 21b, and 21e are not before being positioned at the operation terminal positions, when the operation levers 21a, 21b, and 21e are positioned at the operation terminal positions, detect the full operations of the operation levers 21a, 21b, and 21e.

Further, the present embodiment is adapted to raise the secondary side pressures at the G4 positions from Pb to the maximum output pressures Pc at once; however, the present invention may be adapted to raise the secondary side pressures in proportion to operation amounts of the operation levers 21a, 21b, and 21c in ranges from the G1 positions to the G5 positions (operation terminal positions).

In the present embodiment, the detection signals of the traveling and boom operation detectors 43 and 44 are transmitted to the control unit CU, and when the torque position is the E2 position, the control unit CU switches the torque position to the E1 position.

Also, when the operation levers 21a, 21b, and 21e are restored from the operation terminal positions to the neutral position sides to bring the secondary side pressures of the remote control valves PV1, PV2, and PV6 to less than Pb, the torque position is switched by the control unit CU so as to return back to the E2 position.

Further, operations (operations in the intermediate regions 53) other than the full operations of the operation levers 21a, 21b, and 21e do not cause the torque position to be switched from the E2 position to the E1 position.

As described above, at the time of the full operations of the operation levers 21a and 21b for operating the traveling units 5, and/or at the time of the boom up full operation of the operation lever 21e for operating the boom 15, control is performed to automatically switch to the E1 position, whereas at the time of the operations other than the full operations of the operation levers 21a, 21b, and 21e, the control is performed not to switch to the E1 position, and therefore operations (traveling operation and working operation) aiming at energy saving, and operations (straight traveling full operation time, steering/spin turn full operation time, and boom up full operation time at the time of lifting up the bucket by the boom at the time of excavation or on another occasion) focusing on speed are simplified to simplify structure.

Also, the operations focusing on speed are detected at the two locations, which is economic and highly reliable.

Further, the present embodiment is adapted to automatically switch not to the P position but to the E1 position, and therefore both of operability and a reduction in fuel consumption are achieved.

Still further, in the conventional technique, in the case of switching the maximum absorption torque setting value, a discharge amount of the main pump 18 is changed, and therefore a shake occurs in the body of the backhoe 1; however, at least one of the operation levers 21a, 21b, and 21e is grasped by the operator, and therefore in the case where the body of the backhoe 1 is shaken by any of the operations (operations in the intermediate regions 53) other than the full operations, there occur problems that the operation lever 21a, 21b, or 21e moves relatively to the body to adversely influence operability and also the body operates violently.

In response to this, the present embodiment is adapted to automatically switch to the E1 position by the full operations of the operation levers 21a, 21b, and 21e, in which the full operations cause the operation levers 21a, 21b, and 21e to be operated to the operation terminal positions, and at the operation terminal positions, the members operated with the operation levers 21a, 21b, and 21e are pressed against the valve body sides of the remote control valves PV1, PV2, and PV6 to stably retain the operation levers 21a, 21b, and 21e, so that the adverse influence on operability due the shake of the body caused by the change in discharge amount of the main pump 18 is not present, and therefore, for example, at the time of steering, or on another occasion, without operating violently, the body can turn smoothly to improve operability.

Also, in the case of returning the operation levers 21a, 21b, and 21e to the intermediate regions 53 from the operation terminal positions, the torque position is switched from the E1 position to the E2 position, and even in this case, the discharge amount of the main pump 18 is changed; however, in this case, the switching from the E1 position to the E2 position is made in the middle of operations of the operation levers 21a, 21b, and 21e, and therefore no problem occurs.

Further, the conventional technique is adapted to, in the case where a combined operation of a plurality of operation levers is a combined operation based on a predetermined combination, switch the maximum absorption torque setting value of the hydraulic pump to a higher setting value, and therefore in the neutral regions 51, the maximum absorption torque setting value may be switched. In this case, even in the case where the maximum absorption torque setting value is switched to change the discharge amount of the main pump 18, the operability of the operation levers is not adversely influenced; however, even by operations in the very low speed regions 53A, work or the like is done on the basis of the higher maximum absorption torque setting value, and therefore wasted fuel consumption occurs.

In response to this, in the backhoe 1 of the present embodiment, in the neutral regions 51, very low speed regions 53A, and intermediate speed regions 53B, the maximum absorption torque setting value is not switched (the maximum absorption torque setting value is switched by the full operations of the operation levers 21a, 21b, and 21e), and therefore in operation regions where energy saving is desired to be achieved, the backhoe 1 can be operated surely at the E2 position where the maximum absorption torque setting value is small.

Also, in the hydraulic system that detects the secondary side pressures of the remote control valves PV1, PV2, and PV6 to thereby detect the full operations of the operation levers 21a, 21b, and 21e, in the case where at the time of low temperature, temperature of the oil inside the pilot pump oil passage w is low, even in the case of performing the full operations of the operation levers 21a, 21b, and 21e, the secondary side pressures of the remote control valves PV1, PV2, and PV6 are not easily increased, and therefore a delay in response may occurs in the switching to the E1 position; however, in the present embodiment, the warm-up circuit H is provided, so that even at the time of low temperature, responsiveness of the remote control valves PV1, PV2, and PV6 is good, and therefore responsiveness of the switching to the E1 position at the time of the full operations of the operation levers 21a, 21b, and 21e is good.

Note that in the present embodiment, exemplified is the case of providing the three torque positions; however, four or more torque positions may be set (e.g., the maximum absorption torque setting values are set at positions such as a torque position between the P position and the E1 position).

Also, in the present embodiment, the E1 position is set to make the maximum absorption torque setting value smaller than that at the P position set for a torque value near the maximum torque value in the output torque characteristics of the engine 36; however, the maximum absorption torque setting value at the E1 position may be set for a torque value near the maximum torque value in the output torque characteristics of the engine 36 (accordingly, in this case, P1 position=E1 position).

REFERENCE SIGNS LIST

19 Pilot pump
28 Supply position
29 Unloading position
34 Restriction (flow rate limiting means)
35 Pressure reduction valve (flow rate limiting means)
V13 Unloading valve DV2 Directional control valve (pilot operated directional control valve) of boom control valve
DV4 Directional control valve (pilot operated directional control valve) of right traveling control valve
DV5 Directional control valve (pilot operated directional control valve) of left traveling control valve
PV1 Left traveling remote control valve
PV2 Right traveling remote control valve
PV6 Bucket/boom remote control valve
H Warm-up circuit
Y Discharging circuit for pilot pump
e Connecting oil passage
w Pilot pump oil passage

The invention claimed is:
1. A hydraulic system for a work machine, comprising:
a hydraulic actuator;
a pilot operated directional control valve configured to control the hydraulic actuator;
a remote control valve configured to operate the pilot operated directional control valve in a pilot operation;
a tank;
a pilot pump configured to discharge oil, the oil being sucked from the tank;
a discharging circuit configured to supply the oil, the oil being discharged from the pilot pump;
a pilot pump oil passage configured to supply the oil to the remote control valve, the oil being supplied from the discharge circuit;
an unloading valve configured to include a supply position and an unloading position and to be switched between the supply position and the unloading position, the supply position allowing the discharging circuit to be communicatively connected to a starting end of the pilot pump oil passage, the unloading position blocking the communicative connection between the between the discharging circuit and the starting end of the pilot pump oil passage and allowing the starting end of the pilot pump oil passage to be communicatively connected to the tank; and
a warm-up circuit configured to supply the oil of the discharging circuit to a terminal of the pilot pump oil passage, the warm-up circuit including a connecting oil passage configured to connect the discharging circuit to the terminal of the pilot pump oil passage.

2. The hydraulic system for a work machine according to claim 1, wherein the warm-up circuit includes a restrictor configured to limit a flow rate of the oil flowing from the discharge circuit to the pilot pump oil passage, the restrictor being disposed on the connecting oil passage.

3. The hydraulic system for a work machine according to claim 1, wherein the warm-up circuit includes a pressure reducing valve configured to limit a flow rate of the oil flowing from the discharge circuit to the pilot pump oil passage, the pressure reducing valve being disposed on the connecting oil passage.

* * * * *